United States Patent
Shveima

(10) Patent No.: US 6,403,516 B1
(45) Date of Patent: Jun. 11, 2002

(54) PROCESS FOR PREPARING CHROMIUM PHYLLOSILICATE CLAY CATALYSTS

(75) Inventor: Joseph S. Shveima, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 08/199,907

(22) Filed: Feb. 22, 1994

Related U.S. Application Data

(63) Continuation-in-part of application No. 07/803,864, filed on Dec. 9, 1991, now abandoned.

(51) Int. Cl.$^7$ ................................................ B01J 21/16
(52) U.S. Cl. .......................................... 502/84; 502/85
(58) Field of Search .............................. 502/60, 80, 84, 502/85

(56) References Cited

U.S. PATENT DOCUMENTS

| | | | | |
|---|---|---|---|---|
| 4,452,910 A | * | 6/1984 | Hopkins et al. | |
| 4,465,892 A | * | 8/1984 | Jacobs et al. | |
| 4,629,712 A | * | 12/1986 | Pinnavaia et al. | |
| 4,637,992 A | * | 1/1987 | Lewis et al. | |
| 4,665,045 A | * | 5/1987 | Pinnaviah et al. | ............ 502/84 |

* cited by examiner

Primary Examiner—Steven P. Griffin
Assistant Examiner—Christina Ildebrando
(74) Attorney, Agent, or Firm—Edward L. Bowman

(57) ABSTRACT

A process for preparing pillared chromium phyllosilicate clay α-olefin catalysts is disclosed. This process utilizes palygorskite and sepiolite clays. The pillaring of said clays comprise the steps of: (a) preparing a hydrolyzed first solution by dissolving a chromium salt and a base in water, heating said first solution to a temperature in the range of about 20° C. to about 100° C. while stirring continuously until the solution reaches a pH in the range of about 1.5 to about 2.5 and thereby producing a master batch; (b) diluting said master batch with water to produce a diluted second solution and heating said diluted second solution to produce a heated second solution; (c) adding a solid clay selected from the group consisting of sepiolites and palagorskites to said heated second solution, and continuing heating; (d) recovering said pillared chain silicate clay; (e) drying said pillared chain silicate clay to form first product.

20 Claims, No Drawings

PROCESS FOR PREPARING CHROMIUM PHYLLOSILICATE CLAY CATALYSTS

This application is a continuation-in-part of application Ser. No. 07/803,864 filed Dec. 9, 1991, now abandoned.

This invention relates to a process for forming clay catalysts that can be used in a catalyst system for the polymerization of α-olefins. In one aspect, the present invention relates to novel polymerization catalysts. In another aspect, the present invention relates to a process for polymerizing α-olefins. In yet another aspect, this invention relates to novel polymers of α-olefins.

BACKGROUND OF THE INVENTION

The preparation of pillared interlayer clay compositions by reacting a smectite-type clay with an aqueous solution of suitable polymeric cationic hydroxy metal complexes of metals, such as aluminum, titanium, zirconium and chromium is known, as illustrated in U.S. Pat. Nos. 4,665,045, 4,742,033, herein incorporated by reference. Further, U.S. Pat. No. 4,665,045, Pinnavaia et al. discloses that such pillared interlayed clay compositions that are prepared with chromium can be used in olefin polymerization.

However, there is an ever present need to develop pillared interlayered clays with new processes that result in different catalysts. Equally important is the need to develop a process to produce efficient clay catalysts on a commercial scale. Further, a better understanding of the considerable diversity within this group of clays is needed such that the type of polymers produced can be explored for special or unique properties.

SUMMARY OF THE INVENTION

It is therefore an object of this invention to provide a novel method for preparing catalyst compositions.

It is another object of this invention to provide a novel catalyst composition well-adapted for the polymerization of α-olefins.

It is still a further object of this invention to provide an improved process for the polymerization of α-olefins.

These and other objects of the present invention will become apparent from the disclosure and claims herein provided.

In accordance with the present invention, there is provided a novel method for preparing a new catalyst composition efficient for use in the polymerization of α-olefins by preparing a pillared phyllosilicate clay comprising the following steps of:

(a) preparing a hydrolyzed first solution by dissolving a chromium salt and a base in water, heating said first solution to a temperature in the range of about 20° C. to about 100° C. while stirring continuously until the solution reaches a pH in the range of about 1.5 to about 2.5 and thereby producing a master batch;

(b) diluting said master batch with water to produce a diluted second solution and heating said diluted second solution to produce a heated second solution;

(c) adding a solid phyllosilicate lay selected from the group consisting of dioctahedral and trioctahedral smectites to said heated second solution, and continuing heating;

(d) recovering said pillared phylloilicate clay; and (e) drying said pillared phyllosilicate clay to form a first product.

In a further embodiment there is provided the activation of said clay comprising the following steps of:

(a) heating said first product at a temperature in the range of about 150° C. to about 500° C. and for a time period in the range of about 30 minutes to about 10 hours in an inert atmosphere;

(b) thereafter heating said first product at a temperature in the range of about 500° C. to about 900° C. and for a time period in the range of about 1 hour to about 50 hours in an oxidizing atmosphere and recovering said catalyst composition.

In further accordance with the present invention, there is provided an improved method for the polymerization of α-olefins which results in novel polymer compositions and which comprises: contacting at least one mono-1-olefin having 2 to 8 carbon atoms per molecule with said catalyst; optionally copolymerizing with a conomomer having from about 3 to about 8 carbon atoms per molecule; and optionally combining said catalyst with an organo-metal cocatalyst.

DETAILED DESCRIPTION

General Preparation of Chromium-Pillared Clays

The clays employed in the present invention are the dioctahedral and trioctahedral smectites which have a platelet morphology containing extended sheets of silica tetrahedra and alumina octahedra (smectites) or sheets of silica tetrahedra and magnesia octahedra joined together. The natural abundance and commercial availability of clays make them an inexpensive alternative to more costly synthetic silicas presently used for olefin polymerization.

The method employed consists of considerable modifications to the process disclosed in Pinnavaia et al of U.S. Pat. No. 4,665,045. One differentiating factor is that Pinnavaia is limited to ". . . an aqueous slurry of a layer lattice clay." The present invention provides a novel process for preparing a pillared phyllosilicate clay; the first step of which is preparing a hydrolyzed first solution by dissolving a chromium salt and a base in water, heating said first solution to a temperature in the range of about 20° C. to about 100° C. while stirring continuously until the solution reaches a pH in the range of about 1.5 to about 2.5 and thereby producing a master batch. The heating accomplishes in a reasonable time the hydrolytic polymerization of chromium while the pH indicates when to stop heating so as to optimize the concentration of the highly polyhydroxy chromium oligomers. Using the pH of said first solution to determine when heating Is sufficient is a novel method of accomplishing what is referred to in prior patents as "aging". Preferably, the heating is conducted at a temperature of about 90° C. while stirring continues until said first solution reaches a pH of about 2.3.

Said base is selected from the group consisting of sodium carbonate, ammonium carbonate, sodium hydroxide and ammonium hydroxide with preference given to sodium carbonate. Said salt is selected from the group consisting of chromium nitrate and chromium acetate with preference given to chromium nitrate.

The second step is diluting said master batch with water to produce a diluted second solution and heating said diluted second solution to produce a heated second solution. It was discovered that achieving a diluted said master batch facilitates the goal of producing said pillared phyllosilicate clay on a commercial scale.

Pinnavaia discloses the preparation of a clay slurry to be contacted with a chromium solution. In accordance with the present invention, said master batch containing chromium in solution is diluted and dry (i.e. powdered or free flowing) clay is added. When said pillared phyllosilicate clay is prepared on a commercial scale the liquid volume required to slurry such quantities is too great to be viable. It is unexpected that by diluting said master batch in lieu of slurrying said clay, the liquid volume required is reduced to less than one-fourth of that otherwise required.

The dilution step also provides a means whereby the chromium content of the final catalyst can be controlled. When known methods of preparing pillared phyllosilicate clays are used, the final clay product is high in chromium content; and when this product is utilized as a polymerization catalyst, an unacceptably high amount of Cr(VI) is present. Possible health hazards associated with Cr(VI) are diminished when the initial chromium content is controlled via the method of the present invention.

Said dilution is carried out such that said first solution is diluted to the ratio of about 0.5 ml $H_2O$ to about 10 ml $H_2O$ to about 1 ml master batch, with a preferred amount of $H_2O$ being 4 mls $H_2O$ to about 1 ml master batch. Said said second solution is heated to a temperature in the range of about 20° C. to about 100° C. with a preferred heating at about 90° C.

The third step comprises adding a solid clay selected from the group consisting of dioctahedral and trioctahedral smectites to said heated second solution. The clay is added in solid form for the reasons set out supra. The liquid volume of said second solution is in the range of about 1 ml to about 50 mls per gram of clay and contains an amount of chromium in the range of about 0.001 grams to about 0.01 grams per ml of said second solution, with a preferred volume of said second solution being about 5 mls per gram of clay and containing about 0.002 grams of chromium per ml of said second solution.

The novel pillared clay may be recovered by conventional methods well known to those skilled in the art. However, it is preferred that said pillared phyllosilicate clay be washed and centrifuged with an initial series of washes being conducted with $H_2O$ and a secondary series of washes being conducted with an alcohol for the purpose of removing unbound $H_2O$ before the final drying step and thereby minimizing the collapse of the clay pore structure due to the surface tension of the $H_2O$ during the drying process. This produces a first product which is thereafter dried using any method known to those of skill in the art such as oven or vacuum, or freeze drying. Other methods to remove water include but are not limited to azeotrope drying or spray drying.

General Activation of Chromium-Pillared Clays

The dried chromium pillared clays can be activated to achieve a catalyst system by performing the following steps which comprise:

(a) heating said first product at a temperature in the range of about 150° C. to about 500° C. and for a time period in the range of about 30 minutes to about 10 hours in an inert atmosphere, with a preferred temperature of about 500° C. for a time period of about 1 hour;

(b) thereafter heating said first product at a temperature in the range of about 500° C. to about 900° C. and for a time period in the range of about 1 hour to about 50 hours in an oxidizing atmosphere and recovering a second product, with a preferred temperature of about 650° C. for a time period of about 3 hours.

Optionally, the activation may further comprise cooling said second product to a temperature in the range of about 300° C. to about 500° C. and for a time period in the range of about 1 minute to about 5 hours in a reducing atmosphere, with a preferred temperature of 350° C. for a time period of about 30 minutes. The optional heating accomplishes a more productive olefin polymerization catalyst than that which can be made via one-step continuous heating.

General Polymerication Process Utilizing Novel Catalyst System

The polymerization process of the present invention requires that at least one mono-1-olefin having 2 to 8 carbon atoms per molecule be contacted with said novel catalyst system. The olefin is selected from the group consisting of ethylene, propylene, 1-pentene, 1-hexene, and 1-octene. Preferably said olefin is predominantly ethylene.

A comonomer may be copolymerized with ethylene to form an ethylene copolymer. Said comonomer can be selected from the group consisting of propylene, 1-butene, 1-pentene, 1-hexene, and 1-octene. Preferred copolymers are those of ethylene and 0.4 to 1 weight percent of a comonomer selected from $C_4$ to $C_{12}$ mono-1-olefins, most preferably hexene.

Additionally, said novel catalyst system may be combined with an organo-metal cocatalyst selected from the group consisting of: triethylaluminum, triethylboron, and diethylsilane. Preferred cocatalyst is triethylaluminum.

EXAMPLES

The following examples have been provided merely to illustrate the practice of the invention and should not be read as to limit the scope of the invention or the appended claims in any way.

Tables 1–4 define the characteristics and chemical composition of phylosilicate clays as they exist in nature, in pillared form, after activation, and as utilized as catalysts for polymerization.

TABLE 1

Phyllosilicate Clays Defined

| Clay Type | Source | CEC* meq/100 g | Surface Area $M^2/g$ | Pore Volume $cm^3/g$ |
|---|---|---|---|---|
| | Dioctahedral | | | |
| Smm | Synthetic Mixed-layer Montmorillonite, NL Industries | 135.0 | 120.0 | .47 |
| Vol | Volclay, Bentonite, HPM-20, Wyoming | 68.7 | 34 | .15 |
| Che | Cheto, Apache Co., Arizona | 105.0 | 83.0 | .27 |
| Non | Nontronite, Grant Co., Washington | 84.7 | 54.0 | .15 |
| | Trioctahedral | | | |
| Hca | Hector, California | 29.1 | 51. | .094 |
| Sap | Synthetic Saponite, NL Industries | 105.0 | | |
| Ver | Vermiculite, Llano, Texas | 9.0 | 17. | .38 |

Table 1 presents data which characterizes the phyllosilicate clays utilized.
*CEC = Cation Exchange Capacity

TABLE 2

Pillared Chromium Phyllosilicate Clays

| Catalyst | Clay Type | Cr. Wt. % | Surface Area $M^2/g$ | Pore Volume $cm^3/g$ |
|---|---|---|---|---|
| | | Dioctahedral | | |
| A | Smm | 7.9 | 185 | .55 |
| B | Vol | 11.7 | 296 | .59 |
| C | Che | 11.0 | 235 | .18 |
| D | Non | 10.0 | 269 | .23 |
| | | Trioctahedral | | |
| E | Hca | 22.0 | | |

Table 2 presents chemical and physical data which characterizes the phyllosilicate clays after being chromium pillared. The surface area and pore volume were determined by BET($N_2$) method.

TABLE 3

Activated Pillared Clay Catalysts

| Catalyst | Clay Type | Activation Conditions | Cr Wt. % | Surface Area $M^2/g$ | Pore Volume $cm^3g$ |
|---|---|---|---|---|---|
| | | Dioctahedral | | | |
| A | Smm | 500/$N_2$, 600/Air | 10.0 | 103 | .25 |
| B | Vol | 500/$N_2$, 600/Air | 15.0 | 117 | .16 |
| F | Che | 600/Air | 17.0 | 130 | .22 |
| D | Non | 500/$N_2$, 600/Air | 12.0 | 104 | .10 |
| | | Trioctahedral | | | |
| G | Hca | 500/$N_2$, 600/Air | 36.0 | 186 | .28 |
| J | Sap | 500/$N_2$, 600/Air | 11.0 | 240 | .23 |

Table 3 presents chemical and physical data which characterizes the clay catalysts made from phyllosilicate clays.

TABLE 4

Polymerizations

| Catalyst | Clay Type | CoReagents (ppm) | g Polymer/ g Catalyst/hr | HLMI*[1] | Density $g/cm^3$ |
|---|---|---|---|---|---|
| | | Dioctahedral | | | |
| A | Smm | TEA(2)*[2] | 1130 | .02 | .950 |
| B | Vol | TEA(2) | 760 | .01 | .950 |
| I | Vol | | 602 | .0 | .950 |
| H | Vol | TEA(2)/$H_2$*[3] | 534 | .11 | .954 |
| F | Che | TEA(2) | 430 | .01 | .951 |
| D | Non | TEA(2) | 30 | .01 | |
| | | Trioctahedral | | | |
| G | Hca | TEA(2) | 1020 | .06 | .950 |
| J | Sap | TEA(2) | 920 | .03 | |
| K | Ver | TEA(2) | 360 | .06 | .955 |

Table 4 presents data which demonstrates polymerization results utilizing phyllosilicate clay.
*[1]HLMI — High Load Melt Index
*[2]TEA — Triethylaluminum
*[3]$H_2$ — Hydrogen Preparation of Chromium-Smectite Dioctahedral Pillared Clay Example I The clay used was the Wyoming bentonite, HPM-20, obtained from American Colloid Company. The analysis supplied by the vendor indicates the dioctahedral clay was comprised of the following compounds calculated in oxide form: 63.02 weight percent $SiO_2$; 21.08 weight percent $Al_2O$; 3.25 weight percent $Fe_2O_3$ 0.35 weight percent FeO; 2.67 weight percent MgO; 2.57 weight percent $Na_2O$; 0.65 weight percent CaO; 0.07 weight percent TiO; and 5.64 weight percent $H_2O$. The cation exchange capacity was measured at 68.7 meq/100 grams. Nitrogen pore size distribution measurements showed a surface area of 34 $m^2$/gram and a pore volume of 0.15 cc/gram.

Preparation of Master Batch

Dissolved 1333 grams (3.33 moles) of $Cr(NO_3)_3.9H_2O$ in 13.3 liters of deionized water to which was added slowly while stirring a solution made by dissolving 353 grams (3.33 moles) of $Na_2CO_3$ in 6.7 liters of deionized water. While stirring continuously, the mixture was heated at 90–$95_2$C for 15 to 24 hours replenishing any water lost because of evaporation. The mixture was cooled and stored at ambient temperature.

Three-hundred and fifty ml of dionized water was heated to 90–95° C. To this hot solution was added 50 ml of master batch. After the 90-degree temperature of the solution was reestablished, 20 grams of (bentonite) clay was added slowly while continually stirring. After the addition of clay, stirring and heating of solution was continued for 90 minutes. After cooling to ambient temperature the mixture was transferred to a 1 liter centrifuge bottle. The mixture was centrifuged and washed six times with 500 ml portions of deionized water followed by four times with 500 ml portions of methanol. The pillared clay was dried in a vacuum oven set at 52° C. with a nitrogen purge for 40 hours. The sample was ground using a Laboratory mill (Janke & Kunkel KG, Type A10) and passed through a No. 50 sieve to achieve Product V.

Activation

Example II

Product V was activated for polymerization in a laboratory sized fluidized bed (48 millimeters O.D. quartz tube) at elevated temperatures by sequential treatment with a stream of dry nitrogen for one hour at 500° C. followed by a stream of dry air for three hours at 650° C. After activation, the catalyst was cooled under a stream of dry nitrogen to ambient temperature, recovered and stored in dry nitrogen until ready for use to produce Catalyst VI.

Example III

Activated in a similar manner to Al except after air oxidation, the catalyst was cooled under nitrogen to 350° C. at which temperature a stream of dry CO is passed through the catalyst bed for 30 to 45 minutes. The CO was then purged with dry nitrogen while cooling to ambient temperature. Catalyst was recovered and stored as above to produce Catalyst V2.

Preparation of Chromium-Smectite Trioctahedral Pillared Clay Catalysts

An example of a smectite trioctahedral clay used, was the hectorite, Imvitone 38H, obtained from Industrial Mineral Ventures of Las Vegas, Nev.

Example IV

As described in Example I except used 20 grams of the hectorite clay instead of the bentonite to achieve Product H.

Activation

Example V

Product B was activated as described in Example II to produce Catalyst H1.

Example VI

Product H was activated as described in Example III to produce Catalyst H2.

Example VII

Product H was activated as in the manner described in Example II except Product H was heated at 650° C. for four hours without the preparatory nitrogen step to produce Catalyst H3.

Polymerization

Example VIII

The polymerization of ethylene alone or in admixture with hexene-1 comonomer was carried out in a particle form process employing a 2.6 liter stainless-steel jacketed reactor. After flushing the clean reactor with dry nitrogen and dry isobutane vapor, one liter of dry, liquid isobutane was added as diluent. The sealed reactor was heated to the specified temperature after which a weighted amount of catalyst (0.03 to 1 gram) was charged and a solution of cocatalyst, if used, amounting to about 1.0–2.0 mL of a 0.5 weight percent organometal compound such as triethylaluminum triethylboron and diethylsilane and mixture thereof. The reactor was then pressurized to 550 psig with ethylene and maintained at that pressure throughout the reaction with ethylene flow being regulated by the rate of polymerization. Polymerization time was normally one hour. The productivity is calculated by dividing the weight of the dried reactor product by the weight of catalyst for a one-hour run and is expressed in terms of grams per polymer per gram catalyst per hour. Polymerization times deviating from 60 minutes are normalized to 60 minutes by assuming a linear polymerization response during the run. Thus, the uncorrected productivity value is corrected to 60 minutes by multiplying it with 60 and dividing that result by the actual polymerization time in minutes.

The catalyst, polymerization conditions, results and selected properties of the polyethylenes obtained are presented in Table 5.

TABLE 5

Polymerization Results and Polyethylene Properties

| Catalyst No.(a) | Temp. ° C. | Adjuvant (ppm) | Polymer Properties Productivity g/g/hr | HLMI | Density g/cc |
|---|---|---|---|---|---|
| V | 95 | TEA(5) | 300 | | |
| V | 95 | TEA(5) | 400 | 0.02 | |
| H | 95 | TEA(5) | 1100 | 0.06 | |
| H | 95 | TEA(5) | 780 | 0.27 | |
| H | 95 | TEA(5) | 520* | 0.23 | 0.946 |
| H | 95 | TEA(5) | 650 | | |

*In the presence of 3 weight percent hexene-1

That which is claimed is:

1. A process for preparing a pillared phyllosilicate clay which comprises:
   (a) preparing a hydrolyzed first solution by dissolving a chromium salt and a base in water, heating said first solution to a temperature in the range of about 20° C. to about 100° C. while stirring continuously until the solution reaches a pH in the range of about 1.5 to about 2.5 and thereby producing a master batch;
   (b) diluting said master batch with water to produce a diluted second solution and heating said diluted second solution to produce a heated second solution;
   (c) adding a solid phyllosilicate clay selected from the group consisting of dioctahedral and trioctahedral smectites to said heated second solution, and continuing heating;
   (d) recovering said pillared phyllosilicate clay; and
   (e) drying said pillared phyllosilicate clay to form a first product.

2. A process according to claim 1 wherein said base is selected from the group consisting of sodium carbonate, ammonium carbonate, sodium hydroxide and ammonium hydroxide.

3. A process according to claim 1 wherein said base is sodium carbonate.

4. A process according to claim 1 wherein said salt is selected from the group consisting of chromium nitrate and chromium acetate.

5. A process according to claim 1 wherein said salt is chromium nitrate.

6. A process according to claim 1 wherein said heating of said first solution is conducted at a temperature of about 90° C. while stirring continues until said first solution reaches a pH of about 2.3.

7. A process according to claim 1 wherein said first solution is diluted to the ratio in the range of about 0.5 ml $H_2O$ to about 10 mls $H_2O$ to about 1 ml master batch.

8. A process according to claim 1 wherein said first solution is diluted to the ratio of about 4 mls $H_2O$ to 1 ml masterbatch.

9. A process according to claim 1 wherein said second solution is heated to a temperature of about 90° C.

10. A process according to claim 1 wherein said clay which is added to said second solution is a solid dioctahedral smectite.

11. A process according to claim 10 wherein the liquid volume of said second solution is in the range of about 1.0 mls to about 50 mls per gram of clay and contains an amount of chromium in the range of about 0.001 grams to about 0.01 grams per ml of said second solution.

12. A process according to claim 11 wherein the liquid volume of said second solution is about 5 mls per gram of clay and contains about 0.002 grams of chromium per ml of said second solution.

13. A process according to claim 1 wherein said clay which is added to said second solution is a solid trioctahedral smectite.

14. A process according to claim 13 wherein the liquid volume of said second solution is in the range of about 1.0 mls to about 50 mls per gram of clay and contains an amount of chromium in the range of about 0.001 to about 0.01 per ml of said second solution.

15. A process according to claim 14 wherein said liquid volume of said second solution is about 9 mls per gram of clay and contains about 0.0022 grams of chromium per ml solution.

16. A process according to claim 1 comprising activating said pillared phyllosilicate clay first product to produce a catalyst system wherein said activating comprises:
   (a) heating said first product at a temperature in the range of about 150° C. to about 550° C. and for a time period in the range of about 30 minutes to about 10 hours in an inert atmosphere;
   (b) thereafter heating said first product at a temperature in the range of about 500° C. to about 900° C. and for a time period in the range of about 1 hour to about 50 hours in an oxidizing atmosphere and recovering a second product.

17. A process according to claim 16, further comprising cooling said second product to a temperature in the range of about 300° C. to about 500° C. and for a time period in the range of about 1 minute to about 5 hours in a reducing atmosphere.

18. A process in accordance with claim 17 wherein said second product is heated at a temperature of about 350° C. for a time period of about 30 minutes in a reducing atmosphere.

19. A process in accordance with claim 16 wherein said first product is heated at a temperature in an inert atmosphere of about 500° C. for a time period of about 1 hour; and said first product is reheated at a temperature of about 650° C. for a time period of about 3 hours in an oxidizing atmosphere.

20. A process for preparing a pillared phyllosilicate clay which comprises:

(a) preparing a hydrolyzed first solution by dissolving chromium nitrate and sodium carbonate in water, heating said first solution to a temperature of about 90° C. while stirring continues until said first solution reaches a pH of about 2.3 and thereby producing a master batch;

(b) diluting said master batch wish water to achieve a ratio of about 4.0 mls $H_2O$ to about 1 ml master batch to produce a diluted second solution and heating said diluted second solution at a temperature of about 90° C.;

(c) adding solid dioctahedral smectite clay to said second solution in a ratio of about 5.0 mls of second solution per gram of clay wherein said second solution contains 0.002 grams of chromium;

(d) recovering said pillared phyllosilicate clay to produce a first product by washing and centrifuging said second solution and thereafter drying said first product.

* * * * *